United States Patent [19]

Thompson

[11] Patent Number: 4,495,565
[45] Date of Patent: Jan. 22, 1985

[54] COMPUTER MEMORY ADDRESS MATCHER AND PROCESS

[75] Inventor: Dennis J. Thompson, Geneva, Ill.

[73] Assignee: AT&T Bell Laboratories, Murray Hill, N.J.

[21] Appl. No.: 319,378

[22] Filed: Nov. 9, 1981

[51] Int. Cl.³ .............................................. G06F 9/20
[52] U.S. Cl. .............................................. 364/200
[58] Field of Search ............... 364/200, 900; 371/16, 371/19

[56] References Cited

U.S. PATENT DOCUMENTS

| | | | |
|---|---|---|---|
| 4,037,215 | 7/1977 | Birney et al. | 364/200 |
| 4,063,081 | 12/1977 | Handly et al. | 371/16 |
| 4,128,875 | 12/1978 | Thurber et al. | 364/200 |
| 4,145,738 | 3/1979 | Inoue et al. | 364/200 |
| 4,145,745 | 3/1979 | De Bizl et al. | 364/200 |
| 4,206,503 | 6/1980 | Woods et al. | 364/200 |
| 4,231,087 | 10/1980 | Hunsberger et al. | 364/200 |
| 4,279,014 | 7/1981 | Cassonnet et al. | 364/200 |
| 4,315,313 | 2/1982 | Armstrong et al. | 371/19 |
| 4,340,933 | 7/1982 | Miv et al. | 364/200 |
| 4,392,201 | 7/1983 | Brown et al. | 364/200 |

OTHER PUBLICATIONS

"Storage Protection Mechanism for Processor" Martinez IBM Technical Disclosure Bulletin, vol. 22, No. 10, Mar. 1980.

Primary Examiner—Eddie P. Chan
Assistant Examiner—Jameson Lee
Attorney, Agent, or Firm—J. W. Herndon

[57] ABSTRACT

An address matcher and process for same used as an aid in debugging computer programs. Each of a plurality of random access memories (RAMs) is addressed by a different subfield of a computer memory address so that each access of the computer memory also causes a read of each of the RAMs. Each RAM is programmed with encoded data to define upper and lower block addresses for that subfield of the computer memory address with which it is associated. An output circuit decodes the encoded data read from each of the RAMs as a result of a computer memory access and generates a signal if the computer memory address lies within the monitored address block.

21 Claims, 5 Drawing Figures

FIG. 3

UPPER BLOCK ADDRESS U-030201₁₆
LOWER BLOCK ADDRESS L-010203₁₆

RAM 30

|   | <U | ≤U | >L | ≥L |
|---|----|----|----|----|
| 0 | 1  | 1  | 0  | 0  |
| 1 | 0  | 1  | 0  | 0  |
| 2 | 0  | 0  | 0  | 0  |
| 3 | 0  | 0  | 0  | 1  |
|   | 0  | 0  | 1  | 1  |
| 255 |  |    |    |    |

Outputs: OD1, OD2, OD3, OD4

RAM 31

|   | <U | ≤U | >L | ≥L |
|---|----|----|----|----|
| 0 | 1  | 1  | 0  | 0  |
| 1 | 1  | 1  | 0  | 0  |
| 2 | 0  | 1  | 0  | 1  |
| 3 | 0  | 0  | 1  | 1  |
|   | 0  | 0  | 1  | 1  |
| 255 |  |    |    |    |

Outputs: OD5, OD6, OD7, OD8

RAM 32

|   | <U | ≤U | >L | ≥L |
|---|----|----|----|----|
| 0 | 1  | 1  | 0  | 0  |
| 1 | 1  | 1  | 0  | 1  |
| 2 | 1  | 1  | 1  | 1  |
| 3 | 0  | 1  | 1  | 1  |
|   | 0  | 0  | 1  | 1  |
| 255 |  |    |    |    |

Outputs: OD9, OD10, OD11, OD12

FIG. 5

UPPER BLOCK ADDRESS U-030201₁₆
LOWER BLOCK ADDRESS L-010203₁₆

RAM 30

|   | ≤U | ≥U | ≥L | ≤L |
|---|----|----|----|----|
| 0 | 1  | 0  | 0  | 1  |
| 1 | 1  | 1  | 0  | 1  |
| 2 | 0  | 1  | 0  | 1  |
| 3 | 0  | 1  | 1  | 1  |
|   | 0  | 1  | 1  | 0  |
| 255 |  |    |    |    |

Outputs: OD1, OD2, OD3, OD4

RAM 31

|   | ≤U | ≥U | ≥L | ≤L |
|---|----|----|----|----|
| 0 | 1  | 0  | 0  | 1  |
| 1 | 1  | 0  | 0  | 1  |
| 2 | 1  | 1  | 1  | 1  |
| 3 | 0  | 1  | 1  | 0  |
|   | 0  | 1  | 1  | 0  |
| 255 |  |    |    |    |

Outputs: OD5, OD6, OD7, OD8

RAM 32

|   | ≤U | ≥U | ≥L | ≤L |
|---|----|----|----|----|
| 0 | 1  | 0  | 0  | 1  |
| 1 | 1  | 0  | 1  | 1  |
| 2 | 1  | 0  | 1  | 0  |
| 3 | 1  | 1  | 1  | 0  |
|   | 0  | 1  | 1  | 0  |
| 255 |  |    |    |    |

Outputs: OD9, OD10, OD11, OD12

COMPUTER MEMORY ADDRESS MATCHER AND PROCESS

TECHNICAL FIELD

The invention pertains to computer and data processing systems in general and, in particular, to utility circuits which are a part of, or attached to, such systems and to utility processes for aiding the debugging of programs.

BACKGROUND OF THE INVENTION

It has been a common practice for companies involved in the development of computer systems and software also to provide a separate utility system having the ability to monitor internal computer operations. Typically, such utility systems are used by programmers to "snap" internal computer and memory states at selected points of program operation. These points may be identified, for example, by the execution of program instructions or read/write operations at particular computer memory addresses or blocks of addresses. For example, one typical utility circuit is a block address matcher used to detect transactions at computer memory addresses within a range, or block, defined by specified upper and lower boundary addresses. The circuitry required to implement these utility systems has been traditionally large because of the technology involved. This was not a significant problem in the past, however, because the utility systems were generally used by system designers for noncommercial laboratory use only.

With the advent of modern large-scale integrated circuits resulting in smaller and smaller computer systems and the recognition that the software of complex computing systems is never completely debugged, it is becoming desirable to include utility debugging packages as integral system parts for field debugging. Since utility packages have no role in the normal functional operation of computing systems, it is essential that the physical space occupied by such a package be as small as possible. Even with the use of large-scale integrated circuits in the utility packages, the circuit space required using conventional techniques may be objectionable in comparison to the space occupied by a computer. For example, one conventional technique of implementing computer memory block address matchers in a utility package is to wire in cascade a sufficient number of magnitude comparators to account for each address bit of a computer memory addressing structure. For a 24-bit address bus, for example, a block address matcher using this conventional technique would require six 8-bit buffers for storing an upper and a lower block address for the memory block to be monitored; six 4-bit comparators for each of the upper and lower block addresses, plus some incidental output logic. This amounts to about 18 or 19 integrated circuit chips requiring housing space on the order of perhaps three circuit packs. It would be highly desirable to reduce this space requirement to no more than one circuit pack, especially if the circuitry is to be an integral part of a computer. Related goals would be to accomplish this with circuitry that is less expensive and more conservative of power than conventional techniques.

SUMMARY OF THE INVENTION

The above problems are solved and an advance in the art is obtained in an address matcher and process therefor for detecting computer address transactions occurring within a block of consecutive addressess. The matcher comprises a plurality of memories, each of which is addressable by a different prescribed subfield of the computer address field being monitored. Each addressable location of each memory contains encoded data which defines an in-block or out-of-block condition for that subfield of the computer address with which it is associated. Matcher output circuitry is responsive to the encoded data read from each of the memories as a result of a monitored address transaction for decoding the data to determine if the monitored address lies within the specified address block.

In the preferred embodiment the matcher is used to monitor computer memory address transactions such as instruction fetches and read or write operations. The matcher memories are implemented by three random access memory (RAM) integrated circuit (IC) chips each having 256 words (addressable locations) by 4 bits per word. The computer and computer memory in this embodiment use a 24-bit address bus (field). Each RAM is addressed by a different 8-bit subaddress (subfield) of the computer memory address bus. Two embodiments of output circuitry which decode data from the RAMs is disclosed. The first embodiment uses two 4-bit adders. This embodiment is preferred because it is slightly faster in operation than the second embodiment which uses two 4-bit magnitude comparators.

Write access to the RAMs is provided so that any computer memory address block to be monitored may be specified at will. The data written into the RAMs is encoded to define the monitored block and eliminates the need for separate buffers to store upper and lower block addresses as required in the prior art. The preferred illustrative embodiment thus comprises only three RAM IC chips and two output circuit IC chips as compared to the 19 chips in the mentioned prior art example.

BRIEF DESCRIPTION OF THE DRAWING

In the drawing:

FIG. 3 illustrates the encoded data that would be programmed into the matcher memories of FIG. 2 for an illustrative computer memory block to be monitored;

FIG. 5 illustrates the encoded data that would be programmed into the matcher memories for an illustrative computer memory block in the embodiment of the invention shown in FIG. 4.

DETAILED DESCRIPTION

Figure 1:
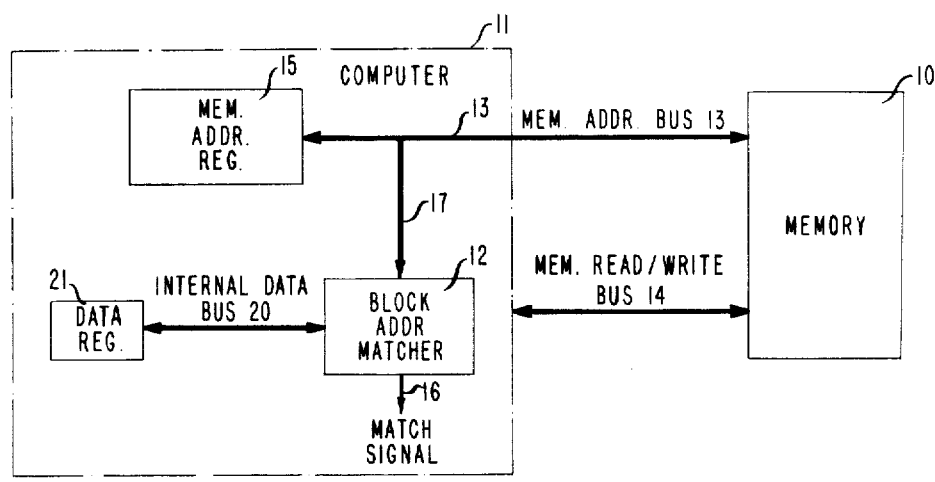
FIG. 1 illustrates in block diagram form a computing system including a memory whose address transactions are to be monitored and a computer containing a block address matcher for monitoring address transactions of the memory.

In accordance with the preferred embodiment of the invention, FIG. 1 illustrates a computer system including a memory 10 and a computer 11. Computer 11 illustratively includes a block address matcher 12 as an integral part of its circuitry. Transactions between memory 10 and computer 11 occur over a read/write bus 14 at memory address locations specified on address bus 13. Computer memory address register 15 supplies memory addresses on the leads of bus 13 for this purpose.

Matcher 12 monitors address transactions of computer 11 with memory 10 by means of leads 17 connecting to address bus 13 and generates a match signal on an output lead 16 whenever a memory address falls within a prescribed block of consecutive addresses. As will be seen, matcher 12 contains a plurality of matcher memories, each of which contain encoded data which define the computer memory addresses of the block to be monitored. An internal data bus 20 connects matcher 12 to a data register 21 by means of which data may be inputted into matcher 12 to define the address block to be monitored. The match signal occurring on lead 16 whenever computer 11 addresses a location in memory 10 contained within a monitored block may be used in any desired manner to indicate an address transaction occurring within the block. The match signal, for example, could be used to trigger a computer 11 interrupt which might result in the "snapping" of the internal state of the computer or of specified areas of memory 10. Alternatively, the match signal could activate additional hardware (not shown) to effect a "snap" without affecting the program flow of the computer.

Figure 2:
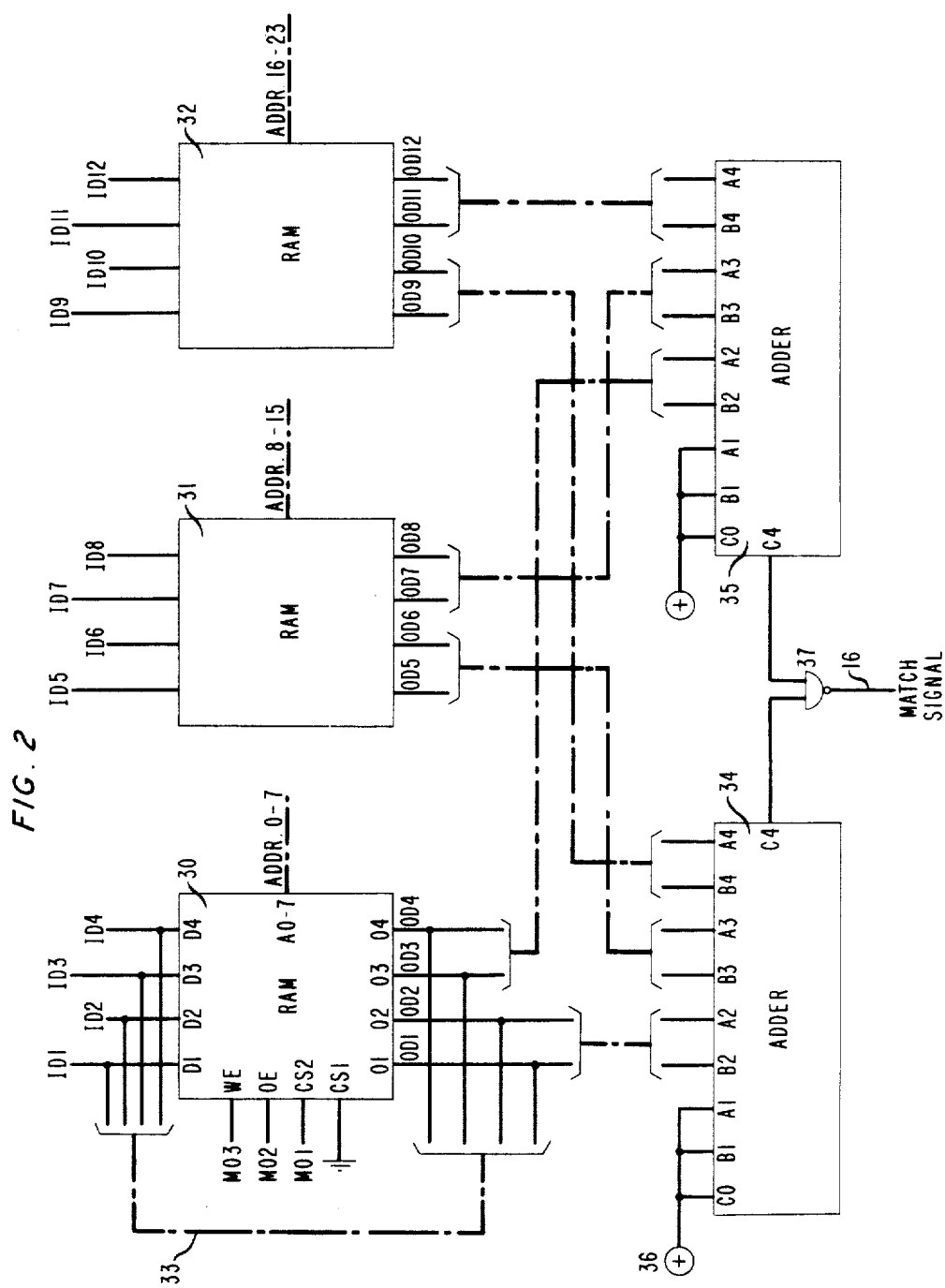
FIG. 2 discloses the circuit details of one embodiment of the address matcher which uses RAM chips for the matcher memories and integrated circuit adders for the matcher output circuitry.

FIG. 2 illustrates the preferred embodiment of block address matcher 12. The matcher comprises a plurality of random access memories (RAMs) 30, 31, and 32 and two adders 34 and 35. Each of the RAMs is illustratively a Fairchild 93412 integrated circuit forming an array of 256 words, or rows, by 4 bits per word in this embodiment. The adders 34 and 35 are conventional full adders capable of adding two 4-bit binary numbers $A_4A_3A_2A_1$ and $B_4B_3B_2B_1$, where $A_4$ and $B_4$ are the most significant digits. These binary designations are chosen to correspond to the input terminal designations of the adders shown in FIG. 2. In addition, each adder has an input "carry" terminal C0 and an output "carry" terminal C4.

By way of example, memory address bus 13 of FIG. 1 contains 24 address leads ADDR0-ADDR23 shown in FIG. 2, together with a number of mode control leads MO1, MO2 and MO3 discussed further below. Each of the RAMs 30, 31, and 32 is addressed by a different subfield of the memory address bus leads; specifically and illustratively, RAM 30 is addressed by the eight lower order leads ADDR0-ADDR7, RAM 31 is addressed by the eight middle order leads ADDR8-ADDR15, and RAM 32 is addressed by the eight upper order leads ADDR16-ADDR23. Each RAM has four input data terminals D1-D4 and four output data terminals 01-04. These terminal designations are shown on RAM 30 and omitted on RAMs 31 and 32 for simplicity. The input terminals D1 through D4 are attached to designated leads of internal data bus 20 shown in FIG. 1 so that the RAMs may be programmed with encoded data. For example, the input data terminals of RAM 30 are connected to data bus leads ID1 through ID4. The output terminals 01 through 04 are connected to prescribed inputs of adders 34 and 35 by means of leads OD1 through OD12. The output data leads are also connected to their associated input data leads by means of connections 33 to provide for both read and write access of the RAMs by computer 11. Thus, leads OD1 through OD4 are connected to leads ID1 through ID4, respectively. Connections 33 are shown only on RAM 30 for simplicity. However, it is understood that leads OD5 through OD12 associated with RAMs 31 and 32 are also connected to leads ID5 through ID12, respectively.

Mode control leads MO1, MO2, and MO3 are illustratively part of the memory address bus 13 and are used to control the operations of each of the RAMs. Lead MO1, for example, is connected to chip select terminal CS2 of each of the RAMs (not shown on RAMs 31 and 32) and a signal thereon activates the RAMs whenever data is to be written into or read from the RAMs. Chip select terminal CS1 is grounded on each of the RAMs. A control signal on lead MO2 places each of the RAMs into a read mode when the RAMs are activated. A signal on lead MO3 places each of the RAMs into a write mode.

Each word of each RAM contains four bits. Two of the bits are associated with an upper block address and two of the bits are associated with a lower block address. The upper address bits appear on RAM output leads OD1, OD2, OD5, OD6, OD9 and OD10 and are routed to adder 34. The lower address bits appear on RAM output leads OD3, OD4, OD7, OD8, OD11 and OD12 and are routed to adder 35. One bit of each word associated with the upper block address is programmed to a binary "1" if the RAM address of that word is less than the state of the corresponding subfield of the upper block address. The other bit of each word associated with the upper block address is programmed to a binary "1" if its RAM address is less than or equal to the state of the corresponding subfield of the upper block address. Otherwise, these bits are programmed to binary "0". These two bits of each word thus satisfy the following truth table where $<U$ means "less than the upper block address" and $\leq U$ means "less than or equal to the upper block address":

| $<U$ | $\leq U$ | MEANING |
|---|---|---|
| 0 | 0 | The RAM address of this word is greater than the corresponding subfield of the upper block computer memory address |
| 0 | 1 | equal to the corresponding subfield of the upper block computer memory address |
| 1 | 1 | less than the corresponding subfield of the upper block computer memory address |
| 1 | 0 | Illegal |

RAM 32 is associated with the most significant computer memory address subfield ADDR16-ADDR23. The two upper block address bits when read from RAM 32 as a result of a computer memory transaction are added in the most significant stage A4, B4 of adder 34. Thus, adder 34 generates a "carry" signal at C4 if the ADDR16-ADDR23 subfield of the computer memory address which addresses RAM 32 is less than ($<U=1$; $\leq U=1$) the corresponding subfield of the upper block address. If the ADDR16-ADDR23 subfield is greater than the corresponding subfield of the upper block address ($<U=0$; $\leq U=0$), adder 34 cannot produce a "carry" at C4. If the ADDR16-ADDR23 subfield is equal to the corresponding subfield of the upper block address ($<U=0$; $\leq U=1$), whether or not a "carry" signal is produced at C4 is determined by the next most significant stage A3, B3 of adder 34. This stage operates exactly as described above with respect to the <U, ≦U bits read from RAM 31, as does the next most significant stage A2, B2 which controls the generation of a C4 "carry" in the event the A3, B3 stage is unable to resolve the decision. The least significant stage A0, B0 and the cascade "carry" input C0 are connected to a potential 36 so that this stage always generates an internal "carry" to stage A2, B2. This causes an internal "carry" to be propagated through each stage to the C4 output when the computer memory address equals the upper block address.

Adder 35 operates in a similar fashion as adder 34 with respect to the two bits from each of the RAMs associated with a lower block address. These bits are designated as >L and ≧L and are programmed to a binary "1" if the subfield of the computer memory address by which they are addressed satisfies the criteria of being "greater than" (>L) or "greater than or equal to" (≧L) the corresponding part of the lower block address. Thus, adder 35 produces a "carry" signal at its C4 output in response to a computer memory transaction if the computer memory address is "greater than or equal" to the lower block address.

The C4 "carry" signals are combined by NAND gate 37 which produces a low going signal on match signal lead 16 if the computer memory address is both equal to or less than the upper block address and equal to or greater than the lower block address.

FIG. 3 shows the contents of RAMs 30, 31 and 32 for an illustrative example in which the upper block address is 030201$_{16}$ and the lower block address is 010203$_{16}$. These addresses are specified here in base 16 because two digits in base 16 produce 256 addresses for a one-to-one correspondence with the 256 words of each of the RAMs. Thus, the most significant digits 03 and 01 of the illustrative upper and lower addresses, respectively, define the block range in RAM 32, the middle digits 02 and 02 of the upper and lower addresses, respectively, define the range in RAM 31, and the least significant digits 01 and 03 of the upper and lower addresses, respectively, define the block range for RAM 30. A brief examination of FIG. 3 should clarify the above discussion. Referring to the contents of RAM 32, for example, since the most significant subfield of the upper block address is 03, each <U bit in words 0, 1 and 2 is set to "1"; this bit is set to "0" in all other words. The ≦U bits in words 0 through 3 are set to "1" and all other ≦U bits are set to "0". Similarly, since the most significant subfield of the lower block address is 01, all >L bits in RAM 32 are set to "1" with the exception of the bits in words 0 and 1. All the ≧L bits are set to "1" with the sole exception of this bit in word 0. The bits in RAMs 31 and 30 are established in a similar fashion with reference to the subfields with which they are associated.

Figure 4:
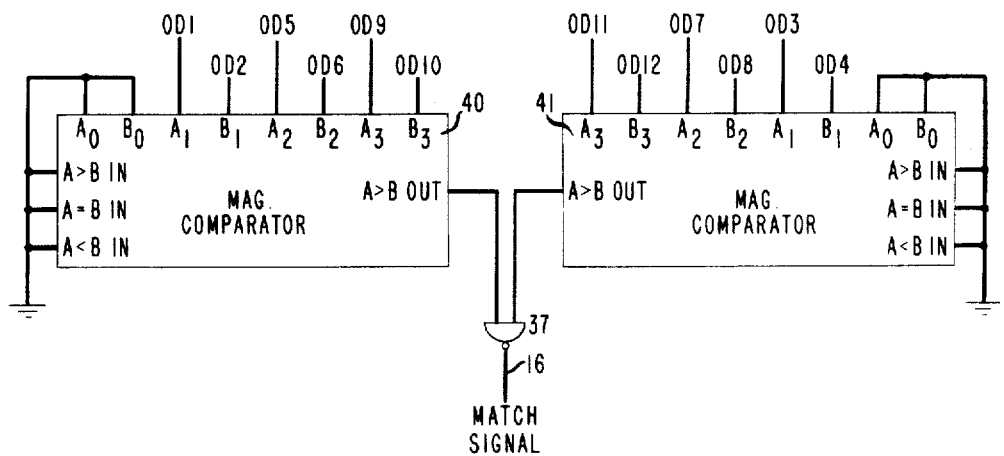
FIG. 4 discloses another embodiment of the output circuitry of the matcher which uses integrated circuit magnitude comparators for the output circuitry.

FIG. 4 illustrates an embodiment of the address matcher in which adders 34 and 35 of FIG. 2 have been replaced with magnitude comparators 40 and 41, respectively. By way of example, these comparators are Texas Instruments, Inc., Type SN 74S85 four bit comparators. Comparator 40 operates on bits from RAMs 30, 31 and 32 associated with the upper block address. Comparator 41 operates on lower block address bits. Both comparators compare the binary values on the B terminals B3, B2, B1 to that on the respective A terminals A3, A2, A1 and produce an appropriate signal on its A>B OUT terminal. The cascade input terminals A>B IN, A=B IN and A<B IN of both comparators are grounded. The SN 74S85 comparator as wired in this embodiment and in conjunction with the coding of the matched RAMs as described below produces an output signal on its A>B OUT terminal whenever the magnitude of the A number is greater than or equal to the magnitude of the B number. The A>B OUT signals are combined by NAND gate 37 to generate match signal 16.

The RAMs are programmed differently for the magnitude comparator embodiment. FIG. 5 illustrates the contents of the RAMs for this embodiment for the same illustrative block addresses used in FIG. 3. As seen, each RAM has ≦U (less than or equal) and ≧U (greater than or equal) bits for the upper block address, and ≧L and ≦L bits for the lower block address. Thus, referring to the contents of RAM 32 in FIG. 5, for example, because the corresponding upper address subfield is 03, the ≦U bits of words 0 through 3 are set to "1" and the remaining ≦U bits are "0"; the ≧U bits of all words are "1" excluding words 0 through 2 which are "0". Because the corresponding subfield of the lower block address is 01, the ≧L bits of all words except word 0 are set to "1" and the ≦L bits in only words 0 and 1 are set to "1".

The arrangement above operates to produce signals from both magnitude comparators 40 and 41 on their A>B OUT terminals whenever the address on a computer memory transaction is less than or equal to a specified upper block address and greater than or equal to a lower block address. If both output signals are present, NAND gate 16 generates a signal on match signal lead 16.

In view of the above teaching, it is obvious that either block matcher can be used as a single address matcher by merely treating the computer memory address in question as both the upper and lower block addresses and programming the RAMs as described above for either embodiment.

Other conditions can, of course, be included as criteria for generating the match signal 16. For example, output circuitry could be added which would allow the generation of output signal 16 only if a data read operation, for example, were occurring. Other output circuitry could be added to require a match of the data being written or read on the read/write bus 14 as an additional criterion.

It is to be understood that the above-described arrangement is merely illustrative of the application of the principles of the invention and that other arrangements may be devised by those skilled in the art without departing from the spirit and scope of the invention.

What is claimed is:

1. For use in a system having a computer memory with a plurality of addressable storage locations, a computer, and an address bus interconnecting the computer and memory for specifying a unique address of a said location in the memory on a memory read or write transaction, an address matcher for detecting memory read and write transactions to a memory address within a block of consecutive computer memory addresses specified by a lower block address and an upper block address, CHARACTERIZED BY a plurality of matcher memories (30, 31, 32) each having a plurality of storage words individually addressable and a word address for each matcher memory being a different portion of said unique address and being supplied by a different prescribed subfield (ADDR0-7, ADDR8-15

ADDR16-23) of the computer memory address bus (ADDR0-23) to output data contained in a word of each matcher memory identified by the word address in the respective subfield and the data of each word of each matcher memory containing indications defining whether or not a word address used to address a matcher memory is within a range having lower and upper boundaries equal to values contained in respective subfields of the lower and upper block addresses corresponding to the subfields of the computer memory address bus supplying the word address, and means (34, 35) responsive to the indications from each of the matcher memories occurring as a result of a memory transaction for determining if the computer memory address lies within the specified block of consecutive memory addresses.

2. The invention of claim 12 in which the means for combining the data outputted from the matcher memories further comprises first means (35) responsive to the data from each of the matcher memories pertaining to the lower block address for generating a first signal (35-C4) if the computer memory address is greater than or equal to the lower block address, second means (34) responsive to the data from each of the matcher memories pertaining to the upper block address for generating a second signal (34-C4) if the computer memory address is less than or equal to the upper block address, and third means (16) responsive to both of the first and second signals for generating the in-block signal.

3. The invention of claim 2 wherein the first and second generating means each comprises a binary adder.

4. The invention of claim 3 wherein each word of each matcher memory comprises a first bit associated with the lower block address of the specified block and set to a first prescribed binary state if its matcher memory word address is greater than or equal to a first prescribed value specified by that part of the lower block address corresponding to the subfield of the address bus used to address the matcher memory, a second bit associated with the lower block address and set to the first prescribed binary state if its matcher memory word address is greater than the first prescribed value, a third bit associated with the upper block address and set to the first prescribed binary state if its matcher memory word address is less than or equal to a second prescribed value specified by that part of the upper block address corresponding to the subfield of the address bus used to address the matcher memory, a fourth bit associated with the upper block address and set to the first binary state if its matcher memory word address is less than the second prescribed value.

5. The invention of claim 4 wherein the first generating means comprises means for adding a number formed by each of the first bits to a number formed by each of the second bits in which the additive order from least significant to most significant of the first and second bits corresponds to the order from the least significant to the most significant of the subfields of the computer memory address bus with which the individual first and second bits are associated.

6. The invention of claim 4 wherein the second generating means comprises means for adding a number formed by each of the third bits to a number formed by each of the fourth bits in which the additive order from least significant to most significant of the third and fourth bits corresponds to the order from the least significant to the most significant of the subfields of the computer memory address bus with which the individual third and fourth bits are associated.

7. The invention of claim 5 or claim 6 wherein the first and second generating means each comprises numerical carry output means for generating the respective first and second signals.

8. The invention of claim 2 wherein the first and second generating means each comprises a magnitude comparator.

9. The invention of claim 8 wherein each word of each matcher memory comprises a first bit associated with the lower block address and set to a first prescribed binary state if its matcher memory word address is less than or equal to a first prescribed value specified by that part of the lower block address corresponding to the subfield of the address bus used to address the matcher memory, a second bit associated with the lower block address and set to the first binary state if its matcher memory word address is greater than or equal to the first prescribed value, a third bit associated with the upper block address and set to the first binary state if its matcher memory word address is greater than or equal to a second prescribed value specified by that part of the upper block address corrsponding to the subfield of the address bus used to address the matcher memory, and a fourth bit associated with the upper block address and set to the first binary state if its matcher memory word address is less than or equal to the second prescribed value.

10. The invention of claim 9 wherein the first generating means comprises means for comparing the numerical state of a word formed by each of the first bits to the numerical state of a word formed by each of the second bits in which the order of comparison from least significant to most significant of the first and second bits corresponds to the order from least to most significant of the subfields of the computer memory address bus with which the individual first and second bits are associated.

11. The invention of claim 9 wherein the second generating means comprises means for comparing the numerical state of a word formed by each of the third bits to the numerical state of a word formed by each of the fourth bits in which the order of comparison from least significant to most significant of the third and fourth bits corresponds to the order from least to most significant of the subfields of the computer memory address bus with which the individual third and fourth bits are associated.

12. The invention of claim 1 wherein the data outputted from each of the matcher memories defines whether or not the respective word address addressing that matcher memory lies within a range identified by values of that part of the upper and lower block addresses corresponding to the subfield of the address bus that addresses the matcher memory, and the means for determining if the computer memory address lies within the specified block of consecutive memory addresses further comprises means for combining the outputted data from each of the matcher memories according to a prescribed algorithm to generated an in-block or out-of-block signal.

13. The invention of claim 12 further comprising means (21) for writing data into each of the words of the matcher memories.

14. The invention of claim 13 wherein each word of each matcher memory comprises a first binary storage bit defining whether or not the word address is less than a first prescribed value specified by that part of the upper block address corresponding to the subfield of the address bus used to address the matcher memory, a second binary storage bit defining whether or not the word address is less than or equal to said first prescribed value, a third binary storage bit defining whether or not the word address is greater than a second prescribed value specified by that part of the lower block address corresponding to the subfield of the address bus used to address the matcher memory, and a fourth binary storage bit defining whether or not the word address is greater than or equal to said second prescribed value.

15. In a system having a computer, a computer memory and a computer memory address bus interconnecting the computer and computer memory, a process of detecting when the computer memory is addressed within a prescribed block of consecutive addresses defined by largest and smallest block addresses, comprising the steps of in response to a read or write operation of the computer memory at an address contained on the address bus, reading encoded data from each of a plurality of second memories at individually addressable words of the second memories identified by subaddresses contained in prescribed subfields of the address bus, said encoded data from each second memory containing low range indications and high range indications specifying whether or not the subaddress used to access a respective second memory is within or without a range defined by the contents of subfields of the largest and smallest block addresses corresponding to the address bus subfield, and decoding the low and high range indications from each of the second memories according to a first algorithm to determine if the address of the read or write operation is within the prescribed block of consecutive.

16. The invention of claim 15 in which the high and low range indications in each word contain true and false states describing whether or not the subaddress of the word is equal to or less than the value in the corresponding subfield of the smallest block address and equal to or less than the value in the corresponding subfield of the largest block address, said method further comprising the steps of computing the high and low range indications for each word of the second memories according to a second prescribed algorithm, and writing the indications into the second memories.

17. The invention of claim 16 wherein the computing step comprises assigning a first prescribed binary state to a first bit of each word in each of the second memories if the address of the word satisfies a first numerical relationship with respect to the value of that part of the smallest block address which addresses the second memory, assigning the first presecribed binary state to a second bit of each word in each of the second memories if the address of the word satisfies a second numerical relationship with respect to the value of that part of the smallest block address which addresses the second memory, assigning the first prescribed binary state to a third bit of each word in each of the second memories if the address of the word satisfies a third numerical relationship with respect to the value of that part of the smallest block address which addresses the second memory, assigning the first prescribed binary state to a fourth bit of each word in each of the second memories if the address of the word satisfies a fourth numerical relationship with respect to the value of that part of the smallest block address which addresses the second memory.

18. The invention of claim 17 wherein the first, second, third and fourth numerical relationships are, respectively, (1) greater than or equal to (2) greater than, (3) less than or equal to, and (4) less than.

19. The invention of claim 18 wherein the decoding step comprises adding a number formed by the first bits of an addressed word of each of the second memories to a number formed by the second bits of the addressed word of each of the second memories, adding a number formed by the third bits of the addressed word of each of the second memories to a number formed by the fourth bits of the addressed word of each of the second memories, wherein the least significant ones of said bits are from the second memory addressed by the least significant subfield of the address bus and the most significant ones of said bits are from the second memory addressed by the most significant subfield of the address bus, and generating an address match indication if a binary carry indication is present from both of the immediately preceding two adding steps.

20. The invention of claim 17 wherein the first, second, third and fouth numerical relationships are, respectively, (1) less than or equal to (2) greater than or equal to, (3) greater than or equal to, and (4) less than or equal to.

21. The invention of claim 20 wherein the decoding step comprises comparing a number formed by the first bits of an addressed word of each of the second memories to a number formed by the second bits of an addressed word of each of the second memories, comparing a number formed by the third bits of an addressed word of each of the second memories to a number formed by the fourth bits of an addressed word of each of the second memories, and generating an address match indication if both of the immediately two preceding comparing steps result in a prescribed comparison condition.

* * * * *